United States Patent
Odaohhara et al.

(10) Patent No.: US 6,910,143 B2
(45) Date of Patent: Jun. 21, 2005

(54) ELECTRONIC POWER UNIT WITH A BATTERY AND A COMPENSATOR FOR CALCULATING THE ACTUAL CHARGE CAPACITY OF THE BATTERY

(75) Inventors: Shigefumi Odaohhara, Yamato (JP); Noboru Tsurukawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 09/824,256

(22) Filed: Apr. 2, 2001

(65) Prior Publication Data

US 2002/0144160 A1 Oct. 3, 2002

(30) Foreign Application Priority Data

Apr. 3, 2000 (JP) ...................................... 2000-101117

(51) Int. Cl.$^7$ ................................................ G06F 1/26
(52) U.S. Cl. ...................................... 713/340; 320/137
(58) Field of Search ................................ 713/300, 310, 713/340; 320/106, 137

(56) References Cited

U.S. PATENT DOCUMENTS 5,444,378 A * 8/1995 Rogers ........................ 324/428
5,712,795 A * 1/1998 Layman et al. ............. 700/297
6,307,349 B1 * 10/2001 Koenck et al. .............. 320/112

FOREIGN PATENT DOCUMENTS

JP          10112336 A  *  4/1998  .......... H01M/10/42

OTHER PUBLICATIONS

"Power Meter in a Notebook PC" IBM Technical Disclosure Bulletin, Jun. 1, 1995, US, pp. 395–396.*

* cited by examiner

Primary Examiner—Lynne H. Browne
Assistant Examiner—Paul Yanchus, III
(74) Attorney, Agent, or Firm—Carlos Munoz-Bustamante; Dillon & Yudell, LLP

(57) ABSTRACT

A main battery used as an electric power unit for a computer is provided with a memory that stores capacity information denoting the total capacity of a battery and compensation information representing the total capacity of the battery as a function of a battery charging cycle count. A CPU detects a cycle count of the battery according to an integrated charged capacity of the battery, thereby obtaining the total capacity with respect to this cycle count from the compensation information so as to compensate the capacity information according to the obtained total capacity.

17 Claims, 11 Drawing Sheets

[Document type] Drawing
[Figure 1]
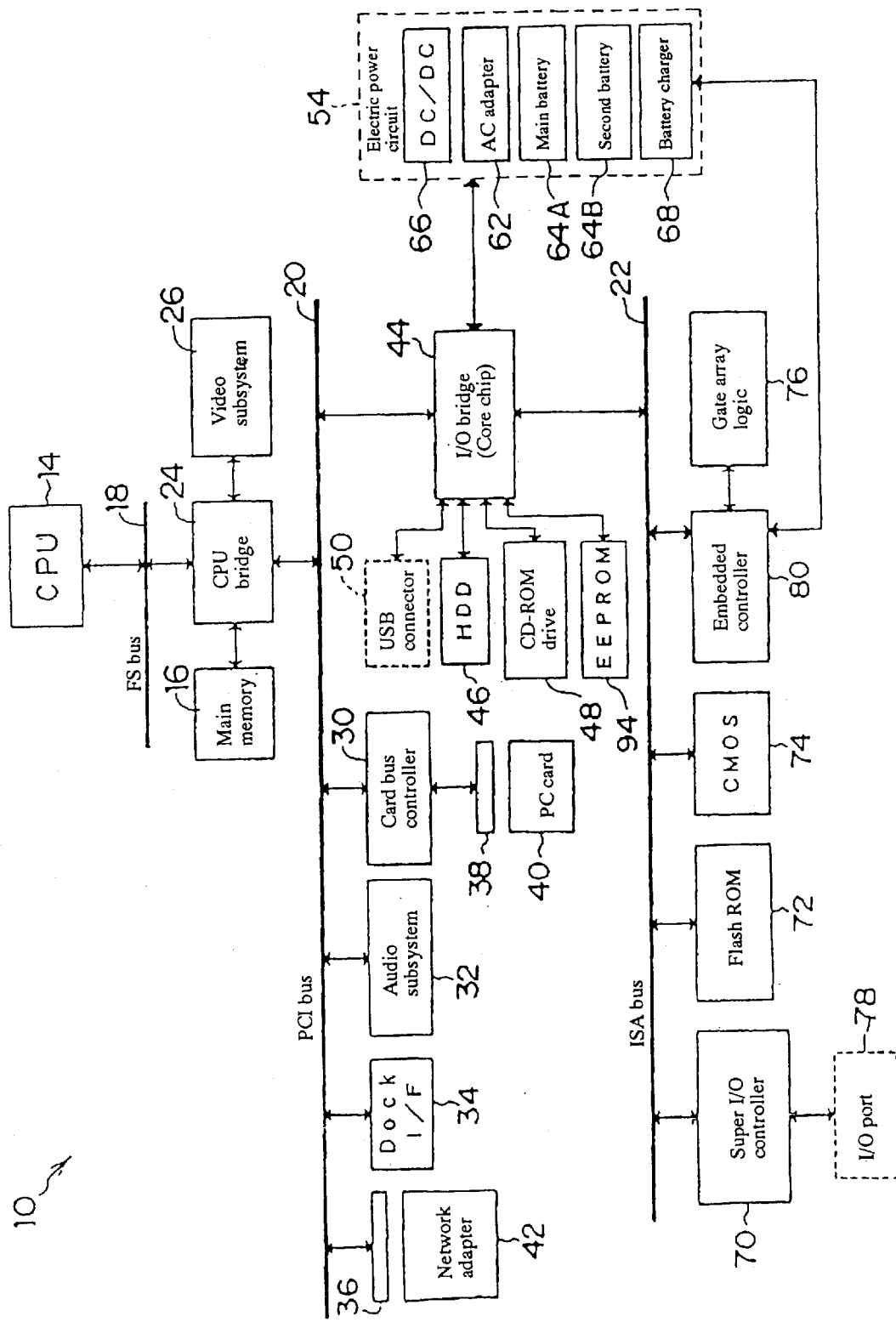

[Figure 2]
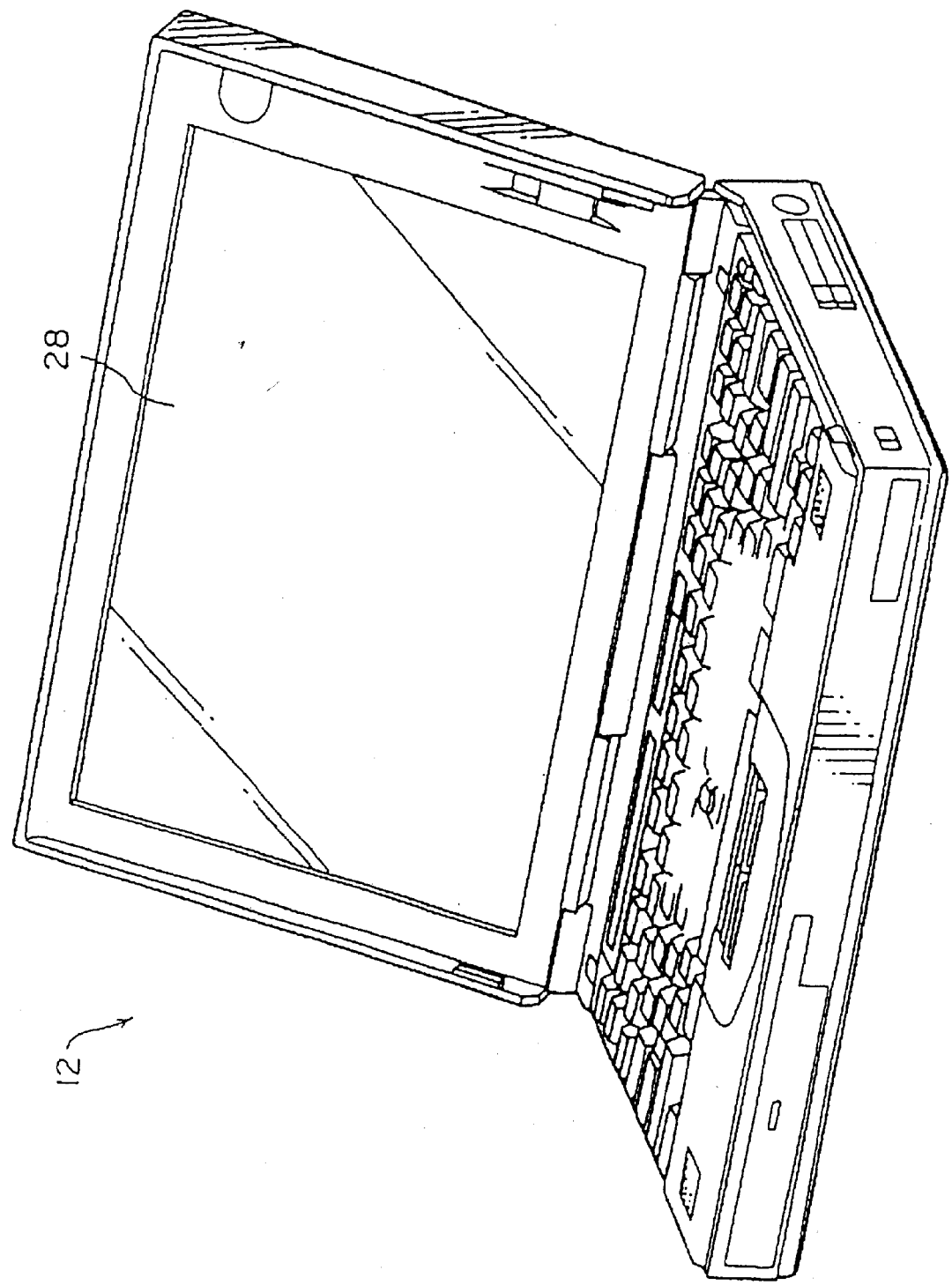

[Figure 3]
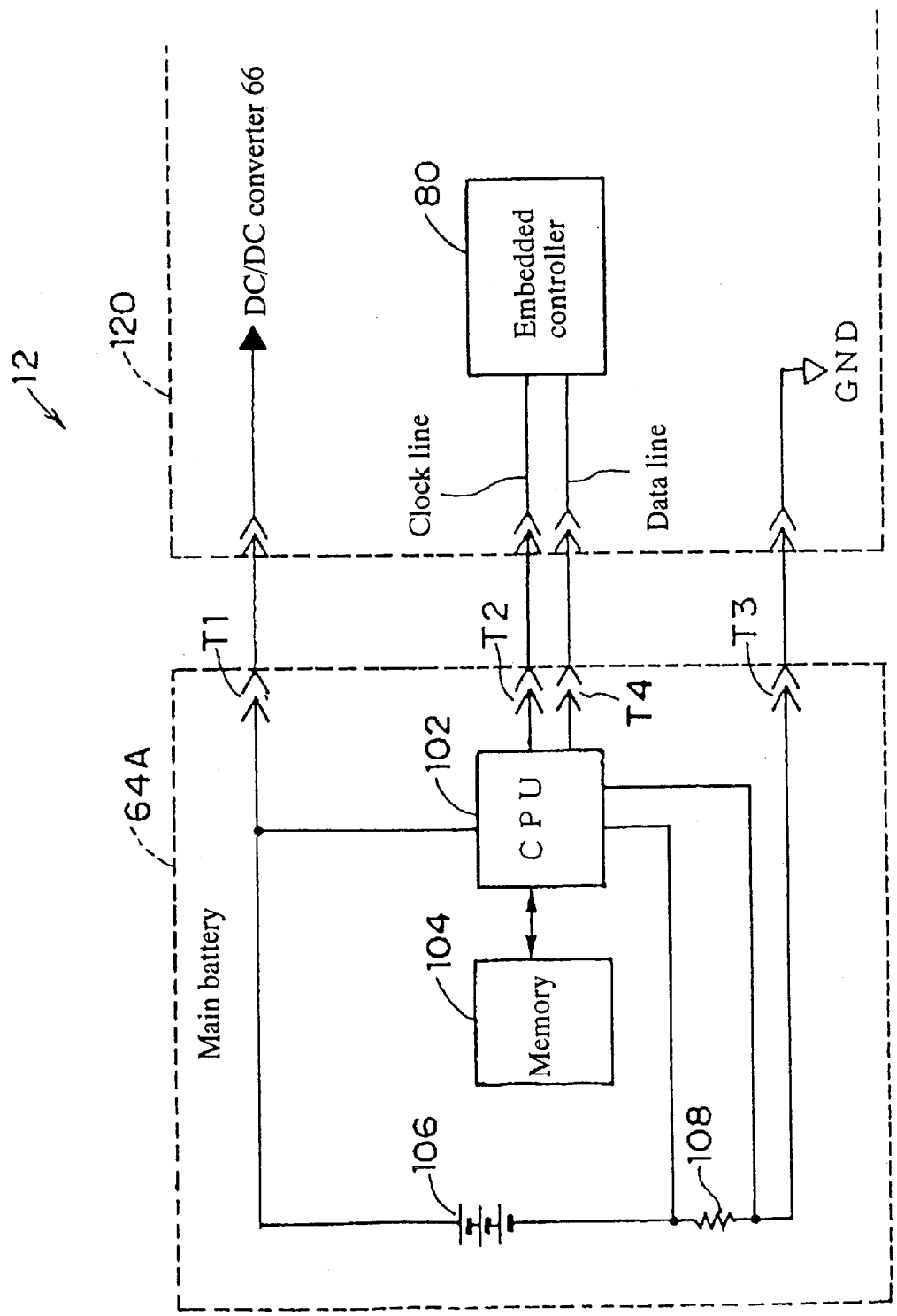

[Figure 4]
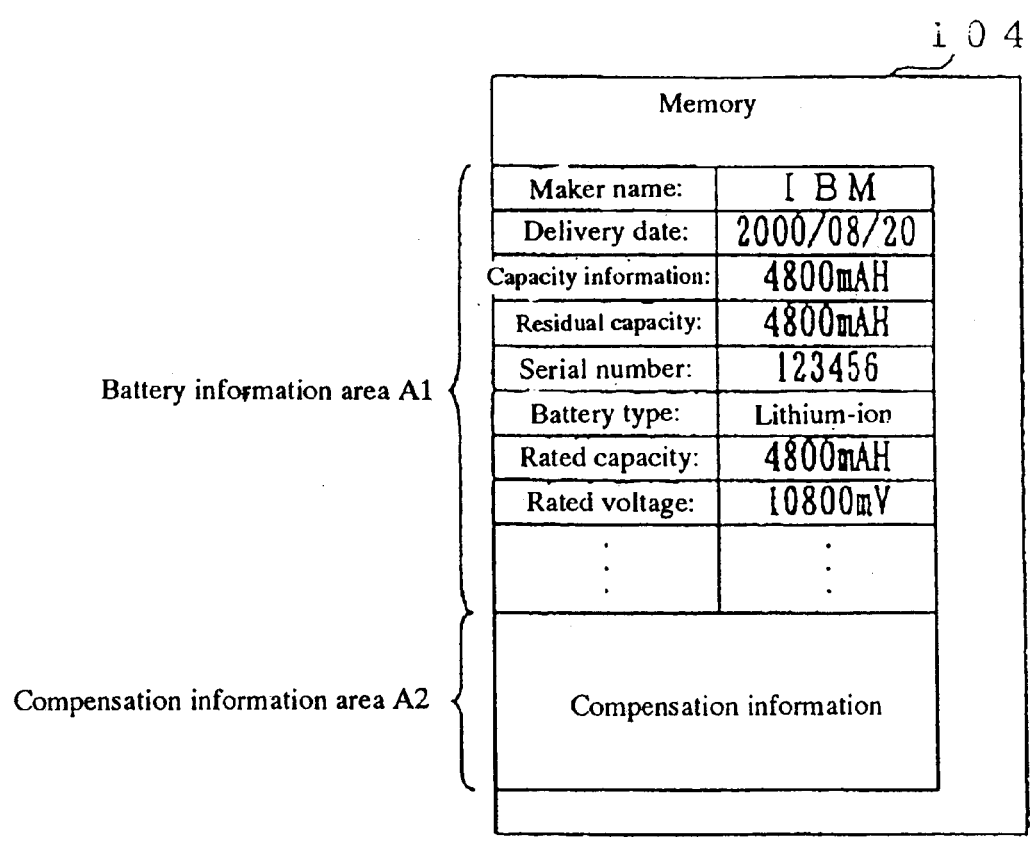

[Figure 5]
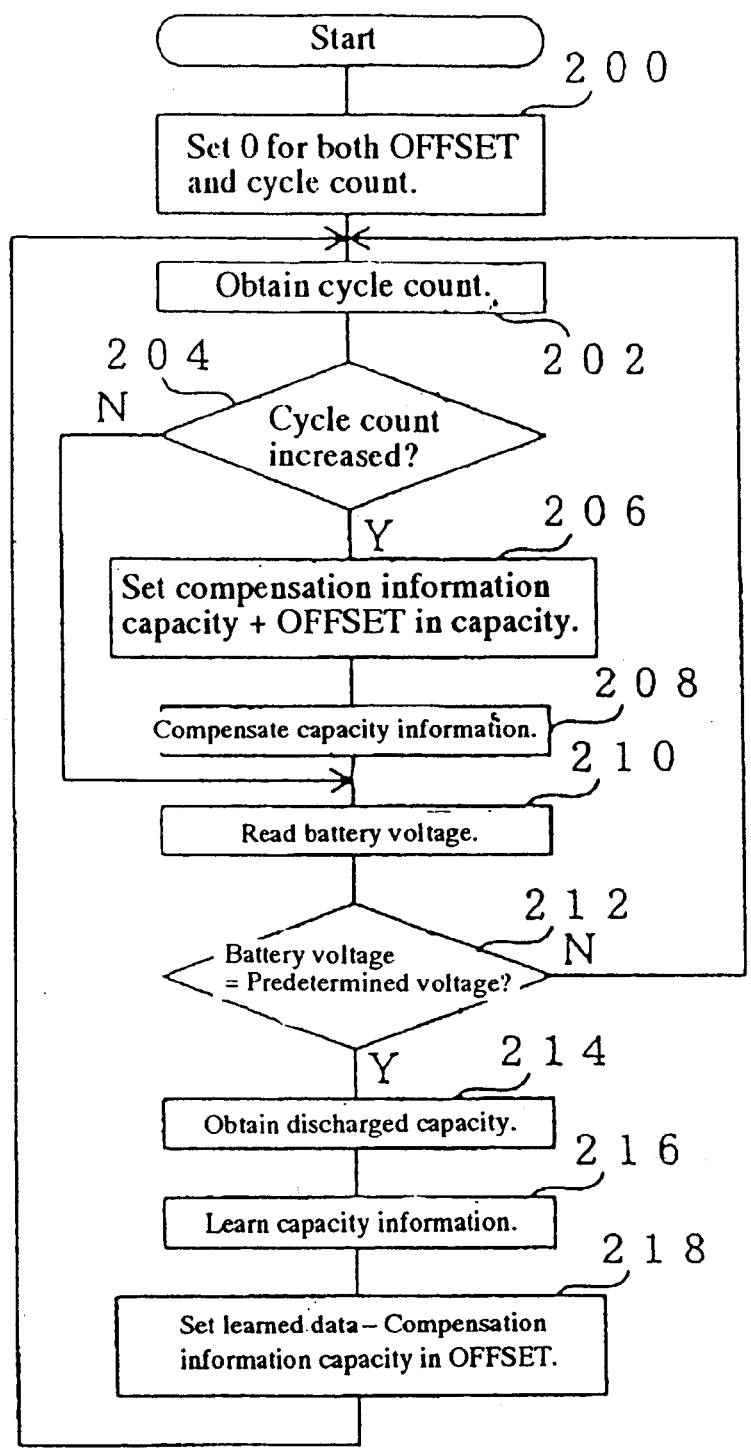

[Figure 6]
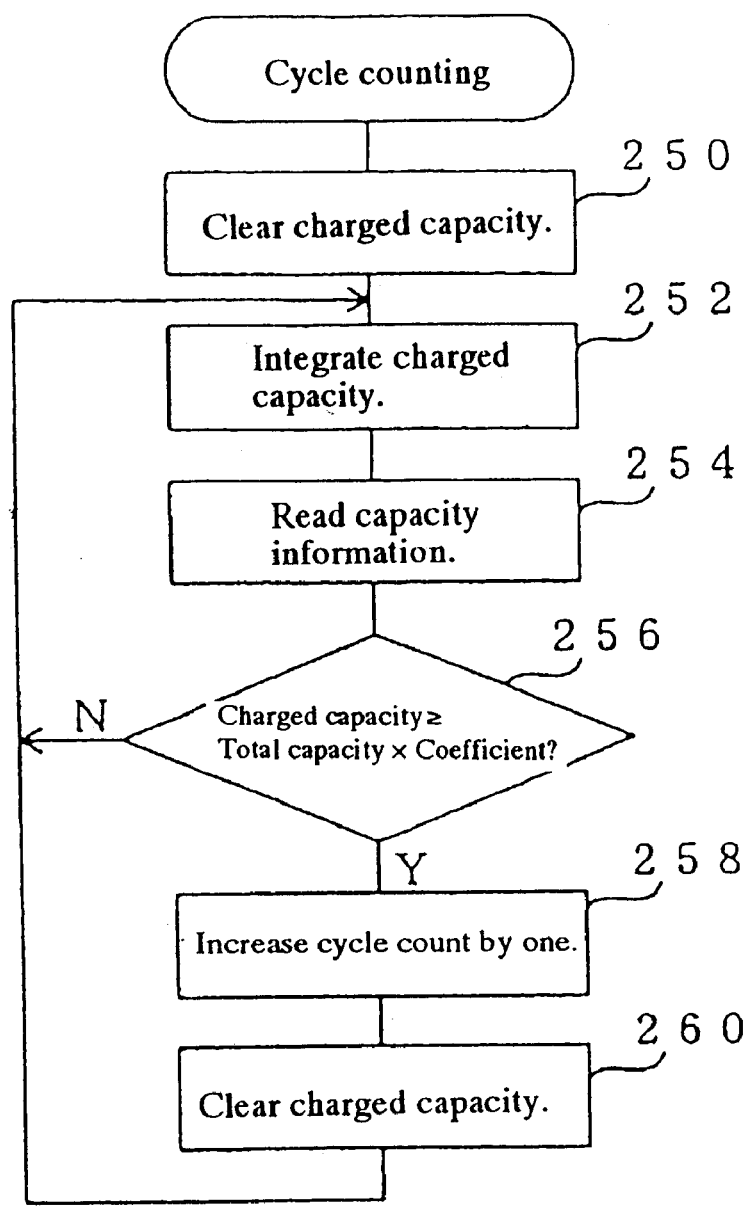

[Figure 7]
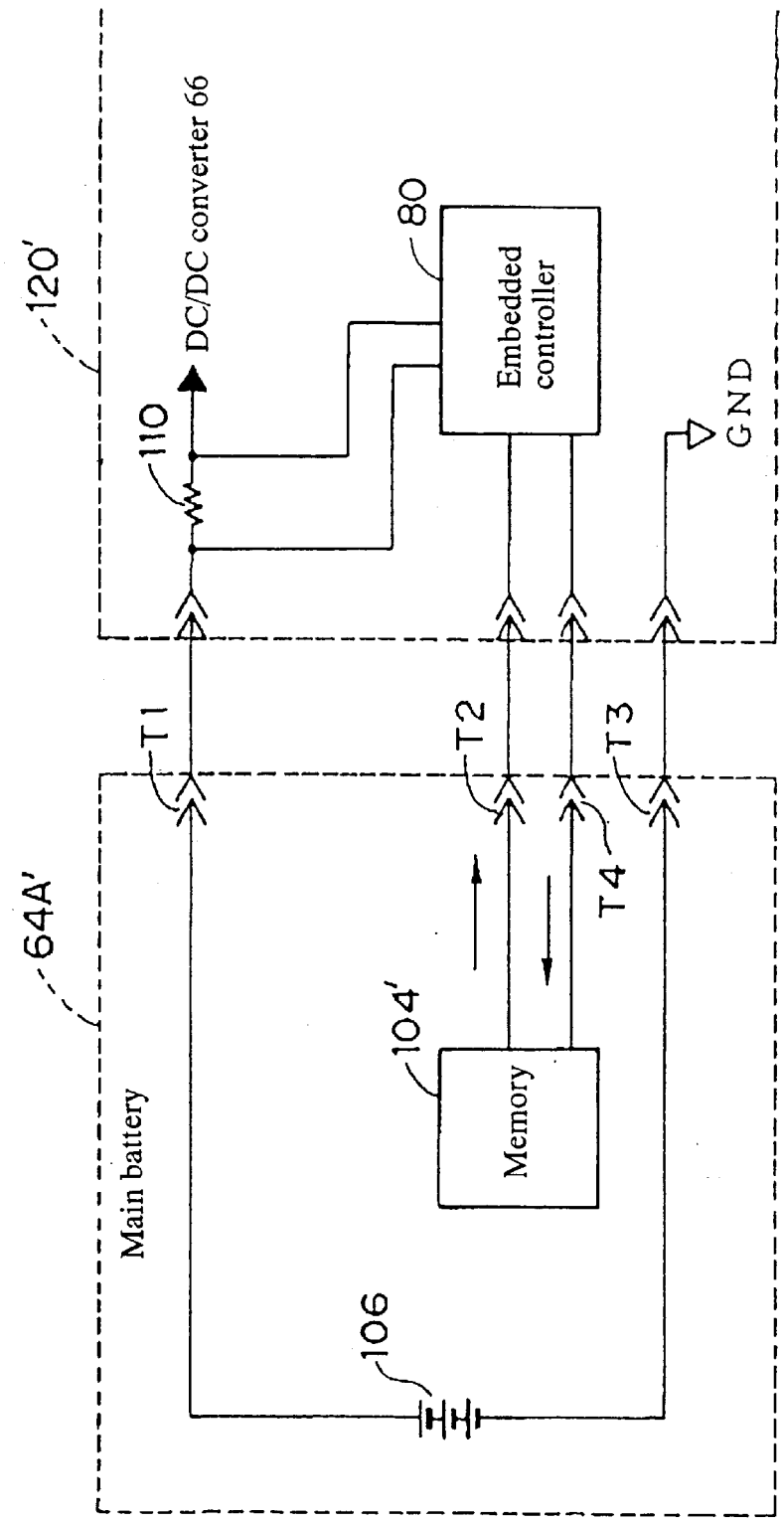

[Figure 8]

| Memory | | |
|---|---|---|
| Maker name: | IBM | |
| Delivery date: | 2000/08/20 | |
| Capacity information: | 4800mAH | |
| Residual capacity: | 4800mAH | |
| Serial number: | 123456 | ← Battery information area A1 |
| Battery type: | Lithium-ion | |
| Rated capacity: | 4800mAH | |
| Rated voltage: | 10800mV | |
| ⋮ | ⋮ | |

104'

[Figure 9]
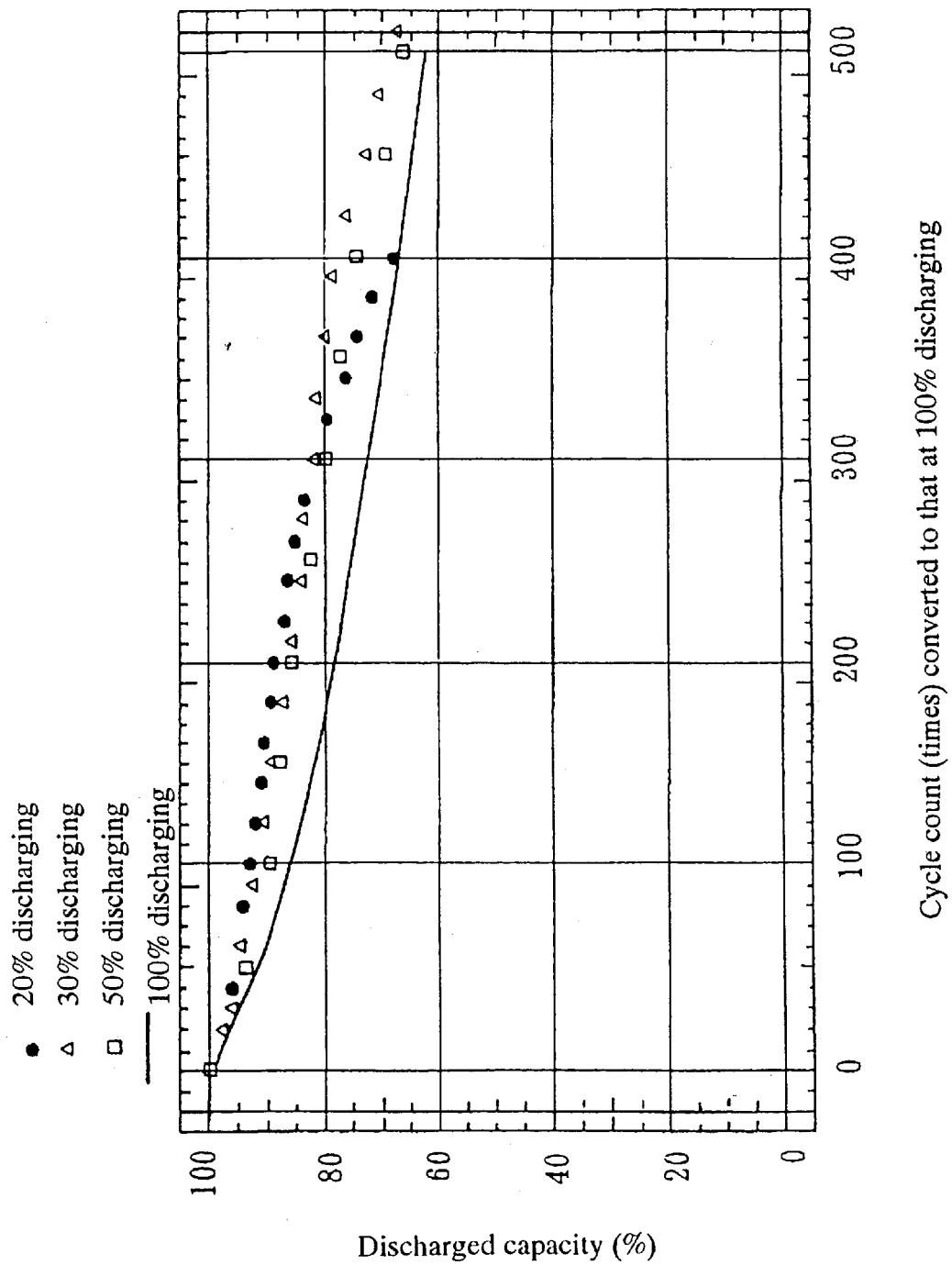

[Figure 10]
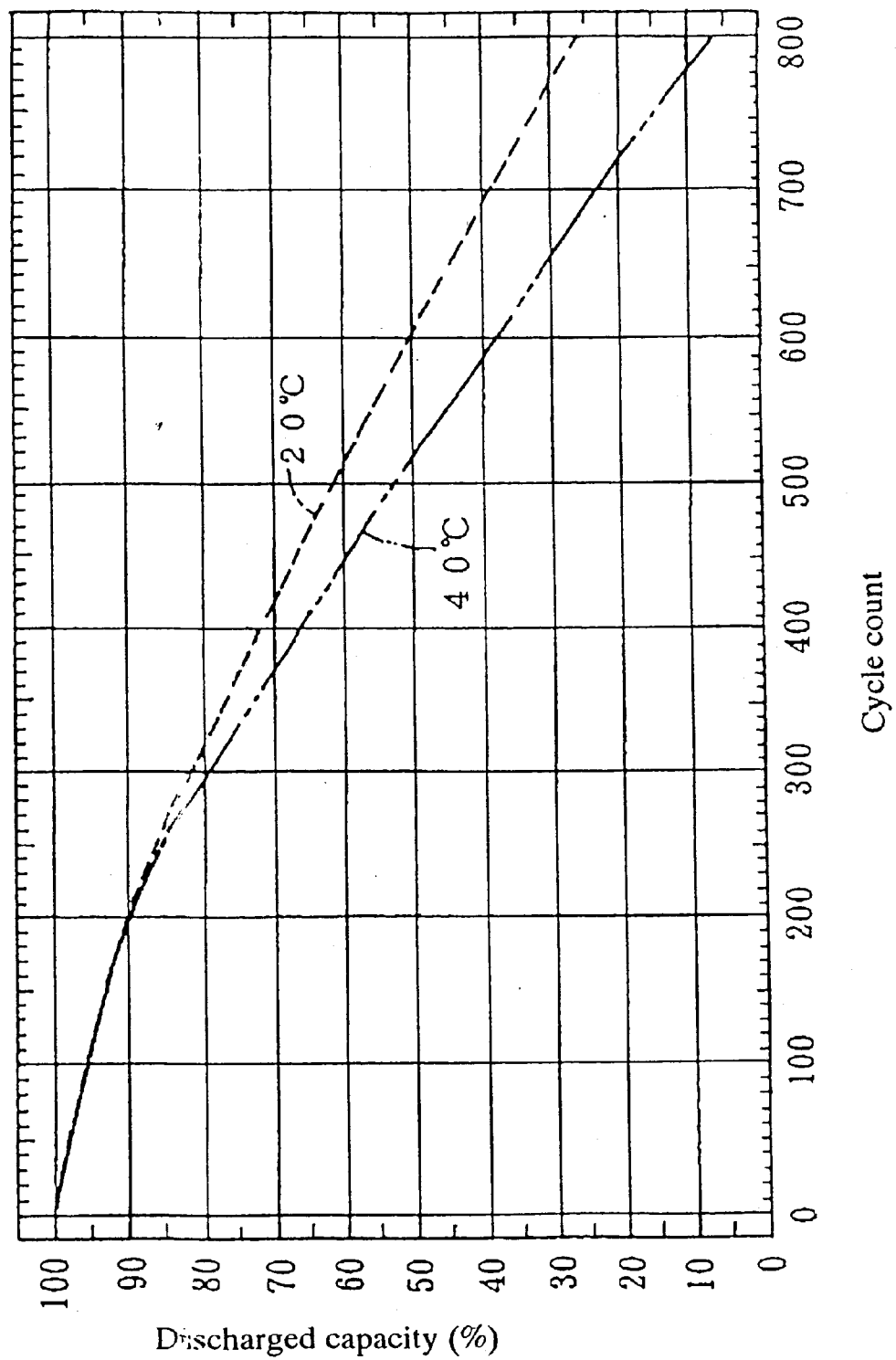

[Figure 11]
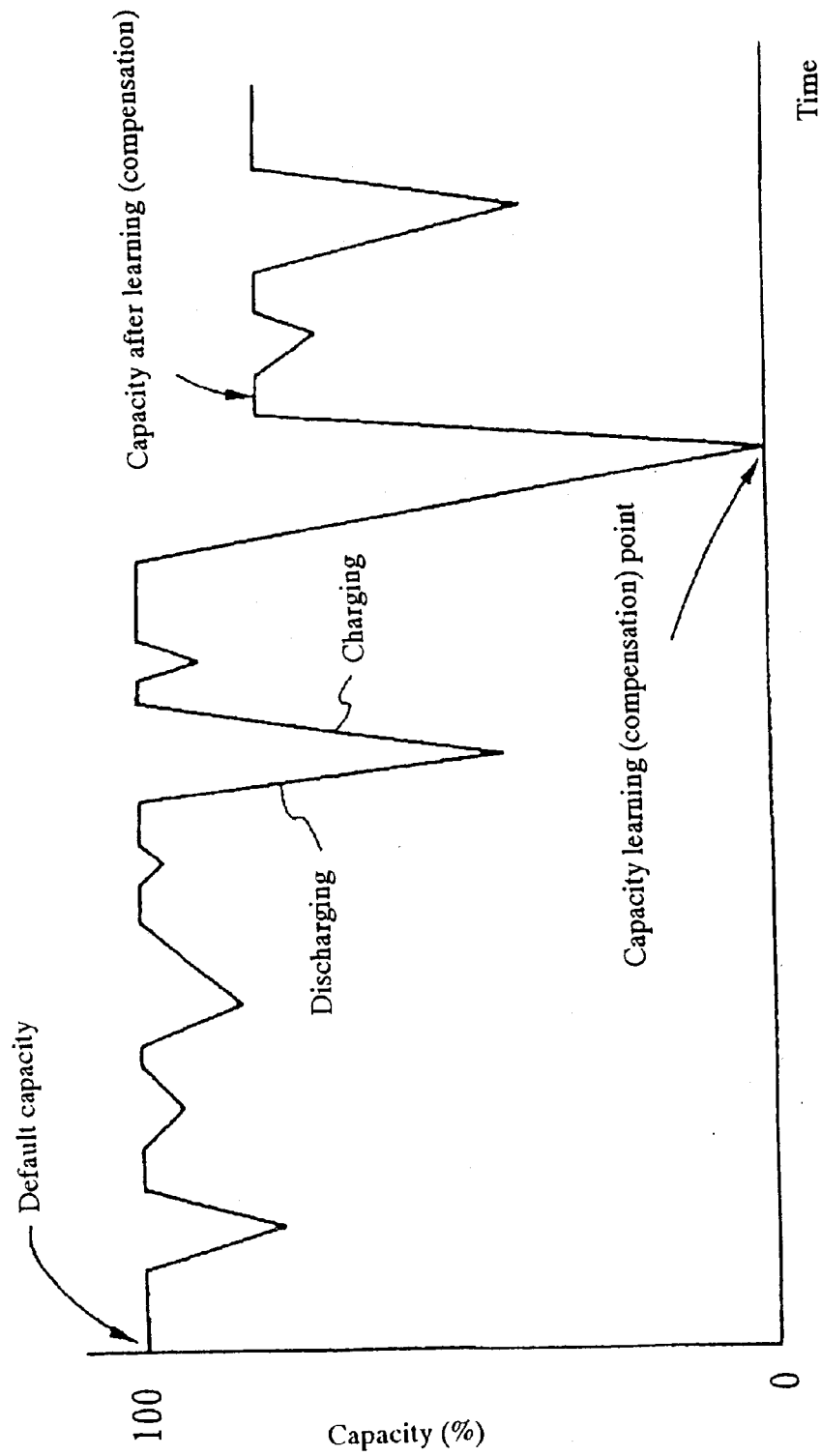

ELECTRONIC POWER UNIT WITH A BATTERY AND A COMPENSATOR FOR CALCULATING THE ACTUAL CHARGE CAPACITY OF THE BATTERY

FIELD OF THE INVENTION

The present invention relates generally to an electric power unit, an electric power capacity information compensator, an electric power capacity information compensating method, and a computer, more particularly to an electric power unit provided with a battery enabled to supply an electric power, an electric power capacity information compensator and an electric power capacity information compensating method for compensating capacity information denoting the total capacity of a battery built in the electric power unit, and a computer that employs the electric power capacity information compensating method.

BACKGROUND OF THE INVENTION

In recent years, there have appeared portable personal computers (hereinafter referred to as portable PCs) developed in various sizes and provided with various functions so as to cope with the spread of mobile computing. For example, there are lap-top personal computers, more compact lap-top personal computers, palm-top personal computers, PDA (Personal Data Assistants) devices, etc.

A portable PC includes a built-in battery which allows use of the portable PC in an environment in which no commercial electric power source is available, for example, in a train. Generally, a rechargeable battery that can be charged for repetitive use is employed as such a battery described above.

While rechargeable batteries are employed widely in home electric appliances including portable PCs, etc., an intelligent battery with an electronic circuit integrated therein is now attracting a great deal of attention. According to this intelligent battery, the electronic circuit integrated in the battery can communicate the battery residual capacity to the connected external device. Consequently, for example, where such an intelligent battery is employed in a portable PC, the user can know the residual capacity of the battery before it is used up during an operation in an environment in which no commercial electric power source is available. The user can thus prevent the portable PC from being shut down abruptly during the operation.

Generally, such an intelligent battery stores capacity information denoting its total capacity beforehand so as to obtain the residual capacity by subtracting the discharged capacity from the total capacity denoted in the capacity information. The discharged capacity is obtained by integrating the discharged current value of the battery.

However, such batteries generally have the characteristic that the total capacity is reduced due to the repetition of charging and discharging. FIG. 10 shows an example of the cycle characteristics of an existing battery configured by three lithium-ion batteries (rated voltage: 4.2V) connected serially under temperatures of 20° C. and 40° C. respectively. In FIG. 10, it is premised that both charging current and discharging current are 2.5A.

As shown in FIG. 10, the greater the number of cycles, the lower the total battery capacity. This tendency appears more strongly under higher ambient temperatures. The "number of cycles" mentioned here is the number of discharging times continued until the battery capacity reaches 0% after the battery is charged from 0% to 100% in capacity.

While the cycle characteristics shown in FIG. 10 are an example of those for the lithium-ion battery, the same tendency also appears in other batteries such as the nickel-hydrogen battery, the nickel-cadmium battery, etc.

This is why ordinary intelligent batteries learn the capacity information by replacing the capacity information with the discharged capacity respectively as shown in FIG. 11. In this case, it is assumed that the discharged capacity of the battery at that time is an accurate total battery capacity when the battery capacity reaches zero or a predetermined capacity near zero. Consequently, it is possible to improve the accuracy of the residual capacity to be obtained after that.

However, the above technique for enabling the battery to learn the capacity information when the capacity reaches zero or a predetermined capacity near zero does not always work; in which case, the accuracy of the residual capacity cannot be improved. This problem arises due to the following two reasons.

First, it is generally very rare that a second battery is discharged completely before it is recharged. As shown in FIG. 11, the battery is often charged when it is only partially discharged to a certain capacity. This cycle operation is repeated. And, in case such the cyclical operation is continued, the battery never learns the capacity information.

Second, "Windows98" of Microsoft Corp., USA, which is an operating system adopted in many personal computers (PC), enables the user to set the percentage of the total capacity of the second battery to be used. The default capacity for this setting is 3%. In this case, the system goes into the hibernation or standby state when the residual capacity of the battery reaches 3% even when the user wants to use the battery up to its zero capacity. Consequently, the battery is never used until its capacity reaches zero in any actual use, so that the battery does not learn the capacity information.

In the above case, the capacity information of the battery is kept at the default capacity (the capacity of the new battery) set in the factory even when the battery is used for a long time and the actual total capacity is reduced. In case the user begins using the battery in such a state, the battery might cause a residual capacity skip error (for example, the residual capacity is reduced to 10% abruptly from 50%). In this case, the user will judge the battery abnormal, so the maker is often forced to replace the battery.

Under such circumstances, it is an object of the present invention to provide an electric power unit, an electric power capacity information compensator, and an electric power capacity information compensating method that can compensate battery capacity information more accurately, as well as a computer that can more accurately compensate the capacity information of its built-in electric power unit.

SUMMARY OF THE INVENTION

The electric power unit of the present invention is provided with a battery and an information storage that stores capacity information denoting the total capacity of the battery, as well as compensation information for denoting the total capacity of the battery with respect to the number of cycles and for compensating the capacity information. The battery may be a lithium-ion battery, a nickel-hydrogen battery, a nickel-cadmium battery, a lithium-polymer battery, or the like. The information storage may be any storage medium, but it should preferably be a non-volatile memory such as an EEPROM, a flash EEPROM, or the like in which data can be rewritten electrically. The compensation information may be a tabulated total capacity of the battery with respect to each predetermined cycle count, a function for calculating the total capacity corresponding to the predetermined cycle count, or the like according to the number of cycles of the battery.

Because the electric power unit of the present invention stores the compensation information that denotes the total capacity of the battery with respect to the cycle count and compensates the capacity information denoting the total capacity of the battery, it is possible to compensate the capacity information accurately according to the cycle count of the battery with use of the compensation information even when the battery capacity never reaches zero nor a predetermined capacity near zero.

In order to enable the electric power unit itself to compensate the capacity information, however, the electric power unit must be provided with a counter for counting the number of cycles of the battery and a compensator for compensating the capacity information according to the total capacity obtained from the compensation information in correspondence to the number of cycles counted by the counter.

In this electric power unit, the counter counts the number of cycles in the battery and the compensator obtains the total capacity corresponding to the above cycle count from the compensation information, thereby compensating the capacity information according to the obtained total capacity. This capacity information can also be compensated by replacing the capacity information with the total capacity obtained from the compensation information and with a capacity obtained by multiplying the total capacity obtained from the compensation information by a coefficient decided by taking such ambient conditions of the battery into consideration.

An electric power unit provided with such a counter and compensator allows easy compensation of the capacity information.

The counter can count the number of cycles of the battery in a unit cycle with respect to the detected discharged or charged capacity of the battery. The unit cycle is the total capacity of the battery or a capacity obtained by multiplying the total capacity of the battery by a predetermined coefficient. The basis for this calculation will be described below.

FIG. 9 shows an example of measurement results of the cycle characteristics of an existing battery when it is discharged partially and completely (100%). The measuring conditions set at that time are as shown below.

| Battery: | A single cell of a lithium-ion battery |
|---|---|
| Temperature: | 25° C. |
| Charging method: | Constant voltage/current charging (constant voltage: 4.2 V, constant current: 1.6 A) |
| Charging time: | 3 hours unconditionally |
| Capacity measuring method: | Discharging of a 1.6 A constant current is started when discharging from each part reaches 100 cycles and the discharging is continued until a battery voltage reaches 2.75 V, then the capacity is measured. |

The horizontal axis in FIG. 9 denotes the number of cycles converted to a value at 100% discharging time. Concretely, in case of 20% partial discharging, one cycle means 20% partial discharging x five times.

As shown in FIG. 9, each of the 20% partial discharging, the 30% partial discharging, and the 50% partial discharging is almost on the same line. While the 20% partial discharging goes slightly out of the line at 350 or more cycles, the reason is considered to be the degradation to occur due to the 3-hour constant current charging. Concretely, because charging is continued while the capacity reaches 100% in a short time, the degradation occurs. For an electronic appliances, however, charging stops when the capacity reaches 100% and this is why in an actual use of the battery, all of the 20% partial discharging, the 30% partial discharging, and the 50% partial discharging are on the same line.

Consequently, it is possible to estimate the battery capacity from the number of cycles by counting one cycle when the integrated charged or discharged capacity reaches a capacity obtained by multiplying the total capacity of the battery by a predetermined coefficient (about 0.9 in case of the battery shown in FIG. 9).

Because the number of cycles can be counted for the battery in a unit cycle with respect to the charged or discharged capacity, it is possible to count the number of cycles easily and accurately even when the battery capacity does not reach zero nor a predetermined capacity near zero. The unit cycle in this case means either the total capacity of the battery or a capacity obtained by multiplying the total capacity of the battery by a predetermined coefficient On the other hand, the compensator of the electric power unit of the present invention should preferably be able to compensate the capacity information according to the total discharged capacity of the battery integrated until the battery capacity reaches zero or a predetermined capacity around zero and compensate the total capacity denoted in the compensation information when the battery capacity reaches zero or a predetermined capacity around zero according to the total discharged capacity of the battery.

That is, because the total discharged capacity of the battery integrated until the battery capacity reaches zero or a predetermined capacity around zero is close to the total capacity or a capacity around the total capacity of the battery at that time, the capacity information can be compensated more accurately when the capacity information is replaced with the total discharged capacity, a capacity decided on the basis of the total discharged capacity, etc. And, the error of the compensation information itself can be compensated by compensating the total capacity denoted in the compensation information obtained according to the total discharged capacity of the battery when the battery capacity reaches zero or a predetermined capacity around zero.

The electric power unit of the present invention should preferably be provided with a temperature sensor so as to enable the information storage to store compensation information corresponding to a temperature to allow the compensator to compensate the capacity information accordingly. The temperature includes an ambient temperature of the battery, a battery temperature, etc. Consequently, the capacity information, since it includes temperature information, can be compensated more accurately.

An electric power capacity information compensator and electric power capacity information compensating method according to the present invention are used to compensate the capacity information in an electric power unit provided with a capacity information storage that stores the capacity information denoting the total capacity of the built-in battery. In addition, the compensator and the method of the present invention can store compensation information denoting the total capacity of the battery with respect to a cycle count and compensating the capacity information beforehand, thereby counting the number of cycles of the battery and compensating the capacity information according to the total capacity corresponding to the cycle count, obtained from the compensation information. It is thus possible to accurately compensate the capacity information according to a cycle count of the battery even when the battery capacity never reaches zero nor a predetermined capacity around zero.

Furthermore, the electric power capacity information compensator and the electric power capacity information compensating method of the present invention can count the number of cycles of the battery in a unit cycle with respect to a discharged or charged capacity detected in the battery just like the electric power unit of the present invention. The unit cycle in this case means either the total capacity of the battery or a capacity obtained by multiplying the total capacity of the battery by a predetermined coefficient. Consequently, the number of cycles can be counted easily and accurately even when the battery capacity never reaches zero nor a predetermined capacity around zero.

Furthermore, in the electric power capacity information compensator and the electric power capacity information compensating method of the present invention, the capacity information should preferably be compensated according to the total discharged capacity of the battery integrated until the battery capacity reaches zero or a predetermined capacity around zero and the total capacity denoted in the compensation information, when the battery capacity reaches zero or a predetermined capacity around zero, should preferably be compensated according to the total discharged capacity of the battery just like in the electric power unit of the present invention. Consequently, it is possible to compensate the capacity information more accurately and compensate the error of the compensation information itself just like in the electric power unit of the present invention.

Furthermore, in the electric power capacity information compensator and the electric power capacity information compensating method of the present invention, compensation information corresponding to a temperature should preferably be included so as to compensate the capacity information according to the compensation information corresponding to a sensed temperature just like in the electric power unit of the present invention. The above sensed temperature includes a used ambient temperature of the battery, a battery temperature, etc. Consequently, because such temperature information is added to the capacity information, the capacity information can be compensated more accurately.

Where the electric power capacity information compensating method of the present invention is employed for a computer provided with components including a CPU, a storage device, a display device, an input device, and an electric power unit that stores capacity information denoting the total capacity of the built-in battery so that all those components are connected to each another via a bus respectively, the storage device may be a recording medium that stores a program for compensating the capacity information stored in the electric power unit in accordance with the electric power capacity information compensating method of the present invention so as to be read from the computer. This computer can thus compensate the capacity information of the electric power unit accurately.

Furthermore, in case the electric power capacity information compensating method of the present invention is employed for a computer provided with components including a CPU, a storage device, a display device, an input device, a network connection device, and an electric power unit that stores capacity information denoting the total capacity of the built-in battery so that all those components are connected to each another via a bus respectively, an external storage device of a server computer disposed on a network to which the network connection device is connected may be a recording medium that stores a program for compensating the capacity information stored in the electric power unit in accordance with the electric power capacity information compensating method of the present invention so as to be read from the computer. This computer can thus compensate the capacity information of the electric power unit accurately.

Hereunder, the preferred embodiments of the present invention will be described with reference to the accompanying drawings.

BRIEF DESCRIPTION OF THE DRAWINGS

FIG. 1 is a schematic block diagram of a computer system according to an embodiment of the present invention;

FIG. 2 is a perspective external view of a lap-top PC;

FIG. 3 is a block diagram of a main battery of the lap-top PC according to a first embodiment of the present invention and a block diagram of the connection between the main battery and other PC components;

FIG. 4 is an explanatory view of an example of the data stored in a memory in the first embodiment of the present invention;

FIG. 5 is a flowchart of the processing of a battery capacity information compensation program executed by the CPU of each of the main battery and a second battery according to the first embodiment of the present invention;

FIG. 6 is a flowchart of the processing of a cycle counting program executed by the CPU of each of the main battery and the second battery according to the first embodiment of the present invention;

FIG. 7 is a block diagram of a main battery of a lap-top PC according to a second embodiment of the present invention and a block diagram of the connection between the main battery and other components of the PC;

FIG. 8 is an explanatory view of an example of the data stored in a memory according to the second embodiment of the present invention;

FIG. 9 is a graph showing the effect of the present invention;

FIG. 10 is a graph showing the problems of the conventional technique; and

FIG. 11 is a graph showing the conventional technique.

DETAILED DESCRIPTION OF THE PREFERRED EMBODIMENTS

FIG. 1 shows an explanatory view of a hardware configuration of a computer system 10, which is a typical personal computer (PC) to which the present invention applies. In FIG. 1, the computer system 10 is divided into subsystems. An example of the PC employing the present invention is a lap-top PC 12 (see FIG. 2) that conforms to the OADG (PC Open Architecture Developer's Group) specifications and having installed therein either Windows98 or Windows NT Operating System (OS) from Microsoft Corporation or OS/2 OS from IBM Corporation. Hereinafter, the components of the computer system 10 will be described.

A CPU 14 that functions as the brain of the whole computer system 10 executes various programs under the control of the OS. The CPU 14 may be any of the "Pentium" family of CPU chips from Intel Corp, or a CPU from AMD Inc., or the "PowerPC" of IBM Corporation or the like.

The CPU 14 is connected to each of the hardware components via a three-layer bus comprising an FS (Front Side) bus 18, which is connected directly to the external pins of the processor (CPU 14) itself; a PCI (Peripheral Component Interconnect) bus 20 used for fast I/O devices; and an ISA (Industry Standard Architecture) bus 22 used for slow I/O devices.

The FS bus 18 and the PCI bus 20 are connected to each other via a CPU bridge (host-PCI bridge) 24 referred to generally as a memory/PCI control chip.

The main memory 16 is a writable memory used as an area in which an execution program of the CPU 14 is read or as a work area in which data processed by the execution program is written.

The execution program mentioned here is, for example, any of such operating systems as Windows98 or the like, various device drivers for operating peripheral devices, application programs dedicated to specific business works, and such firmware programs as the BIOS (Basic Input/Output System), stored in the flash ROM 72, which is the program for controlling the input/output of such hardware devices as a keyboard, a floppy disk drive, etc.

The PCI bus 20 is of a type enabled to transfer data comparatively fast and the PCI bus 20 is connected to such PCI devices as a card controller 30 driven comparatively fast.

The video subsystem 26 is used to execute video-related functions. The subsystem 26 includes a video controller that actually processes each drawing instruction from the CPU 14, writes the processed drawing information in the video memory (VRAM) once, and reads drawing information from the VRAM so as to display it on a liquid crystal display (LCD) 28 (see FIG. 2) as drawing data.

The PCI bus 20 is connected to a card bus controller 30, an audio subsystem 32, a docking station interface (Dock I/F) 34, and a mini-PCI slot 36 respectively. The card bus controller 30 is used exclusively to connect the bus signal of the PCI bus 20 directly to the interface connector (card bus) of a PCI card bus slot 38. The card bus slot 38 is disposed, for example, on the wall surface of the PC 12 body and enabled to load a PC card 40 conforming to the specifications (ex., "PC Card Standard 95") regulated by PCMCIA (Personal Computer Memory Association)/(JEIDA (Japan Electric Industry Development Association).

The dock I/F 34 is a hardware component used to connect the PC 12 to the docking station (not illustrated). The mini-PCI slot 36 is connected to a network adapter 42 used to connect, for example, the computer system 10 to a network (ex., LAN).

The PCI bus 20 and the ISA bus 22 are connected to each other via an I/O bridge 44. The I/O bridge 44 is provided with a bridging function used between the PCI bus 20 and the ISA bus 22; an IDE (Integrated Drive Electronics) interface function; a USB (Universal Serial Bus) function, etc. The I/O bridge 44 has a real time clock (RTC) built in itself. For example, a device (core chip) referred to as the PIIX4 (Intel, Inc.) can be used as the I/O bridge 44. The IDE interface realized by the IDE interface function is connected to an IDE hard disk drive (HDD) 46 and to the IDE CD-ROM drive 48 via an ATAPI (AT Attachment Packet Interface).

The I/O bridge 44 is provided with a USB port connected to a USB connector 50 provided, for example, on the wall surface of the PC 12 body.

Furthermore, the I/O bridge 44 is connected to an EEPROM 94 via the SM bus. The EEPROM 94 is a non-volatile memory used to hold such information as the password registered by each user, a supervisor password, the serial number of the product, etc. The information in the EEPROM 94 can be rewritten electrically.

The I/O bridge 44 is also connected to an electric power circuit 54. The electric power circuit 54 is provided with such circuits as an AC adapter 62; a battery charger 68 used to charge the main battery 64A or second battery 64B configured as an intelligent battery, and a DC/DC converter 66 used to generate such DC constant voltages as 5V, 3.3V, etc. used for the computer system 10.

The main battery 64A and the second battery 64B in this embodiment are configured so as to conform to the smart battery specifications respectively. The smart battery specifications which are jointly developed by Intel Corp. and Duracell Inc. enable an electronic circuit built in the battery 64A/64B to communicate the residual battery capacity to a connected external device. The smart battery specifications also enable the internal memory to store such information as the maker, the serial number, the rated capacity, etc., so that the user can get those information items stored in the memory with various commands specified by the smart battery specifications.

On the other hand, in the core chip that configures the I/O bridge 44 are provided an internal register used to manage the electric power state of the computer system 10 and a logic (state machine) used to manage the electric power state of the computer system 10 including the operation of the internal registers.

The logic described above exchanges signals with the electric power circuit 54, thereby recognizing the supply of the electric power to the computer system 10 from the electric power circuit 54. And, according to each command from the logic, the electric power circuit 54 controls the supply of the electric power to the computer system 10.

The ISA bus 22 has a slower data transfer rate than the PCI bus 20. The ISA bus 22 is connected to comparatively slow peripheral devices (not illustrated), such as a flash ROM 72 configured by a super I/O controller 70, an EEPROM, etc.; a CMOS 74; an embedded controller 80 connected to the gate array logic 76; and a keyboard/mouse controller.

The super I/O controller 70 is connected to the I/O port 78. The super I/O controller 70 controls the driving of the floppy disk drive (FDD), the input/output of parallel data via a parallel port, and the input/output of serial data via a serial port.

The flash ROM 72 is a non-volatile memory used to hold such programs as the BIOS, etc. The data stored in this ROM 72 can be rewritten electrically. The CMOS 74 is a non-volatile semiconductor memory connected to a backup electric power source.

It functions as fast storage means.

The embedded controller 80 controls the keyboard (not illustrated). The controller 80 also controls the power management controller built therein so as to bear part of the electric power management function in cooperation with the gate array logic 76.

FIG. 3 shows a block diagram of the main battery 64A with respect to the connection between the main battery 64A and each of other components. As shown in FIG. 3, the main battery 64A in the first embodiment is configured by a CPU 102 that controls the operation of the whole main battery 64A; a memory 104 that stores various data items; a battery 106 configured by three lithium-ion batteries of a 4.2V rating voltage disposed serially; a resistor 108 that detects the charged and discharged capacities of the battery 106; and four external terminals T1 to T4. The memory 104 may be a rewritable non-volatile memory such as an EPROM, an EEPROM, a flash EEPROM, or the like.

One electrode of the battery 106 is connected to an external terminal T1 and the other electrode of the battery 106 is connected to an external terminal T3 via the resistor 108. And, the CPU 102 is connected to the memory 104, so that the CPU 102 can write/read various data to/from the memory 104. The CPU 102 is also connected to the external terminals T2 and T4, so that the CPU 102 can exchange various information with external devices. Both terminals of the resistor 108 are connected to the CPU 102, so that the CPU 102 can detect both charged and discharged capacities of the battery 106 according to a current value of the line connected from the other electrode of the battery 106 to the external terminal T3. The CPU 102 is further connected to one electrode of the battery 106, so that the CPU 102 can detect the voltage of the battery 106.

On the other hand, the external terminal T1 is connected to an input terminal of a DC/DC converter 66 included in the internal circuit 120 (a component other than the main battery 64A and the second battery 64B) and the electric power of the battery 106 of the main battery 64A is supplied to the DC/DC converter 66. The external terminals T2 and T4 are connected to an embedded controller 80 of the internal circuit 120, so that the embedded controller 80 can exchange various information items with the CPU 102 of the main battery 64A. The external terminal T3 is also connected to a ground terminal of the internal circuit 120 so as to be grounded. In order to configure a battery conforming to the smart battery specifications, many more circuits and external terminals are required. However, they are already known by the concerned people and not so important for the concept of the present invention, so description for them will be omitted in this specification.

The configuration of the second battery 64B is identical to that of the main battery 64A shown in FIG. 3. And, just like the main battery 64A shown in FIG. 3, the external terminals T1 to T4 of the second battery 64B are respectively connected to the DC/DC converter 66, the embedded controller 80, and the ground terminal (none of which is illustrated).

The PC 12 in this embodiment has a battery pack pit (not illustrated). The main battery 64A and the second battery 64B are removably mounted in this battery pack pit. The main battery 64A and the second battery 64B, when mounted in the battery pack pit, are connected to the DC/DC converter 66, the embedded controller 80, and the ground terminal via the external terminals T1 to T4 respectively.

Next, the data stored in the memory 104 in the first embodiment will be described with reference to FIG. 4. As shown in FIG. 4, the memory 104 has a predetermined battery information area A1 for storing, for example, "the maker name," "the delivery date," "the capacity information," "the residual capacity," "the serial number," "the battery type," "the rated capacity," and "the rated voltage" of the subject battery. The maker stores each of those data items in the corresponding address at the delivery time. In the example shown in FIG. 4, "IBM" is stored as the maker name and "Aug. 20, 2000" is stored as the delivery date at the delivery time. Especially, both of "the capacity information" and "the residual capacity" are related closely to the present invention and the maker stores the same data as "the rated capacity" as a default capacity at the delivery time. In this case, "the capacity information" denotes the total capacity of the battery 106 and it is equivalent to the capacity information of the present invention. The battery information area A1 is provided with an area for storing "the battery voltage" and "the discharged capacity" (both not illustrated) as data related to the present invention. The CPU 102 detects the voltage of the battery 106 so as to keep updating the value of "the battery voltage" and detects the discharged capacity from the battery 106 according to the current flowing in the resistor 108 so as to keep updating the above "discharged capacity."

Furthermore, the memory 104 has a predetermined compensation information area A2 for storing compensation information denoting the relationship between each cycle count and a capacity of the battery 106 as shown in Table 1 below.

TABLE 1

| Cycle Count (Times) | Capacity (mAh) |
|---|---|
| 0–50 | 4800 (100%) |
| 51–100 | 4656 (97%) |
| 101–150 | 4560 (95%) |
| 151–200 | 4416 (92%) |
| 201–250 | 4320 (90%) |
| 251–300 | 4080 (85%) |
| 301–350 | 3840 (80%) |
| 351–400 | 3456 (72%) |
| 401–450 | 3216 (67%) |
| 451–500 | 2880 (60%) |
| 501–550 | 2544 (53%) |
| 551–600 | 2160 (45%) |
| 601–650 | 1824 (38%) |
| 651–700 | 1488 (31%) |
| –701 | 1200 (25%) |

In this embodiment, the compensation information is obtained according to the cycle characteristics of the battery at 40° C. as shown in FIG. 10.

On the other hand, the main battery 64A and the second battery 64B in the first embodiment conform to the smart battery specifications as described above and a command set as shown in Table 2 as an example is prepared for the batteries 64A and 64B.

TABLE 2

| Function | Code | Access (r/w) | Data |
|---|---|---|---|
| Maker name | 0x20 | r | Character string |
| Delivery date | 0x1b | r | Unsigned integer |
| Capacity information | 0x10 | r | Unsigned integer |
| Residual capacity | 0x0f | r | mAh or 10 mAh |
| Serial number | 0x1c | r | Numeric |
| Battery type | 0x33 | r | Character string |
| Rated capacity | 0x18 | r | mAh or 10 mAh |
| Rated voltage | 0x19 | r | mV |

For example, the "residual capacity" related especially to the present invention is just enabled to be read (r). The residual capacity of the battery 106 can be read from the memory 104 with the command "0x0f" sent to the CPU 102 of the main battery 64A or the second battery 64B from the embedded controller 80.

And, the "capacity information" is also enabled just to be read (r). The capacity information of the battery 106 can be read from the memory 104 with the command "0x10" sent to the CPU 102 of the main battery 64A or the second battery 64B from the embedded controller 80.

In addition to those shown in FIGS. 1 and 3, many more electrical circuits are required to configure the computer system 10. However, because those electrical circuits are already known by the people concerned and they are not relevant to an understanding of the present invention, they will be omitted in this specification. And, also note that only some of the connections between hardware And, also note that only some of the connections between hardware blocks in FIGS. 1 and 3 are shown in order to simplify the description.

Next, a description will be made for processes executed by the CPU 102 of each of the main battery 64A and the second battery 64B with reference to FIGS. 5 and 6. FIG. 5 shows a flowchart of the processes of a battery capacity information compensating program executed by the CPU 102. FIG. 6 shows a flowchart of the processes of a cycle counting program executed by the CPU 102. Each of those programs is stored beforehand in a predetermined area in the memory 104. In addition to the processes of the above programs, the CPU 102 also executes a process for obtaining the residual capacity of the battery 106 by reducing the discharged capacity of the battery from the total capacity denoted in the "capacity information" in the memory 104, thereby periodically writing the residual capacity in an address corresponding to the "residual capacity" stored in the memory 104.

In step 200 shown in FIG. 5, "0" (zero) is set in the variable OFFSET as the initial capacity and the number of cycles is set to "0" (zero). In the next step 202, the CPU 102 obtains the number of cycles of the battery 106, which is counted by the cycle counting program to be described later.

In the next step 204, the CPU decides whether or not the obtained cycle count is increased. In case it is increased (YES), control goes to step 206 so as to add the capacity set in the variable OFFSET to the capacity corresponding to the cycle count set in the compensation information stored in the memory 104 at that time, thereby compensating the capacity value in the compensation information. In step 208, the CPU 102 compensates the capacity information according to the compensation information stored in the memory 104. Control then goes to step 210. The compensation processing in step 206 is to compensate the error of the compensation information itself according to the capacity set in the variable OFFSET in step 218 (to be described later). In case the processing in step 218 has never been executed, however, "0" (zero) is set in the variable OFFSET by the processing in step 200. Thus, the compensation information is not compensated. The compensating processing in step 208 is done by rewriting the capacity information stored in the memory 104 to a value (ex., 4656 mAH in case the cycle count is 60) corresponding to the cycle count obtained in step 202.

On the other hand, in case it is decided in step 204 that the obtained cycle count is not increased (NO), the CPU 102 skips the processes in steps 206 and 208. Control then goes to step 210.

In step 210, the CPU 102 reads the "battery voltage" (not illustrated in FIG. 4) from the memory 104 so as to decide whether or not the read battery voltage is the predetermined value (9.0V in this embodiment) corresponding to the battery capacity=0 (zero) in step 212. In case of the predetermined voltage (YES), control goes to step 214 so as to read the "discharged capacity" (not illustrated in FIG. 4) from the memory 104 and obtain the discharged capacity of the battery 106. Then, the CPU 102 rewrites the capacity information in the memory 104 to the discharged capacity obtained in step 214 so as to learn the capacity information in step 216.

In the next step 218, the CPU 102 sets a capacity in the variable OFFSET. The capacity is obtained by reducing the capacity corresponding to the compensation information stored in the memory 104 from the learned data (the discharged capacity obtained in step 214). Control then goes back to step 202.

In case the cycle count is increased, the CPU 102 repeats the processes in steps 202 to 218 as described above so as to compensate the error of the compensation information itself stored in the memory 104 by use of the value set in the variable OFFSET according to the previously learned data (discharged capacity), as well as compensates the capacity information according to the compensation information. The CPU 102, when the battery voltage of the battery 106 becomes a predetermined capacity equivalent to the residual capacity=0, regards the discharged capacity obtained at that time as a correct total capacity, so that the CPU 102 rewrites the "capacity information" stored in the memory 104 with the discharged capacity and learns the rewritten capacity as the new capacity information.

On the other hand, in case the battery voltage is decided not to be the predetermined capacity (NO) in step 212, that is, when the residual capacity of the battery 106 is not "0" (zero), the CPU 102 skips the processes in steps 214 to 218. Control then goes back to step 202.

Next, a cycle counting process will be described with reference to FIG. 6.

In step 250 shown in FIG. 6, the CPU 102 clears the discharged capacity. In the next step 252, the CPU 102 integrates the charged capacity obtained on the basis of the value of the current flowing in the resistor 108. The CPU 102 then reads the capacity information from the memory 104 in step 254 so as to obtain the total capacity of the battery 106. In step 256, the CPU 102 decides whether or not the integrated charged capacity is over the capacity obtained by multiplying the total capacity of the battery obtained in step 254 by a predetermined coefficient (0.9 in this embodiment). In case the result is YES, the CPU 102 decides that charging is done for one cycle. Control then goes to step 258 so that the CPU 102 increases the cycle count by one, then clears the charged capacity in step 260. After that, control goes back to step 252.

On the other hand, in case the result is NO in step 256, the CPU 102 skips the processes in steps 258 and 260. Control then goes back to step 252.

By repeating the processes in above steps 252 to 260, the CPU 102 integrates the charged capacity in each cycle count and increases the cycle count by one each time the battery 106 is charged by one cycle. Concretely, the original cycle count means the number of times the battery, after being charged up to 100% from 0%, is discharged up to 0% of the capacity as described above. In this embodiment, however, one cycle is defined as a case in which the battery is charged up to 100% from 0% according to the integrated charged capacity. At this time, the ground that the battery capacity is regarded to have reached 100% from 0% according to the integrated charged capacity is as described above.

To obtain a residual capacity of each of the main battery 64A and the second battery 64B in the internal circuit 120 of the PC 12, the embedded controller 80 sends the command "0x0f" to the CPU 102 of the main battery 64A or the second battery 64B. The residual capacity of the battery 106 can thus be read from the memory 104.

As described above in detail, because each of the main battery and the second battery in the first embodiment indicates the total capacity of the battery with respect to a cycle count and stores compensation information used to compensate the capacity information denoting the total capacity of the battery, it can compensate the above capacity information accurately according to the cycle count of the battery with use of the above compensation information even when the battery capacity never reaches zero nor a predetermined capacity near zero.

And, because each of the main battery and the second battery in the first embodiment detects its own charged capacity and counts the number of cycles thereof in a unit cycle with respect to the charged capacity, it can get the cycle count easily and accurately even when the battery capacity never reaches zero nor a capacity near zero. The unit cycle in this case means a capacity obtained by multiplying the total capacity by a predetermined coefficient.

Furthermore, each of the main battery and the second battery in the first embodiment regards its discharged capacity integrated until its voltage reaches a predetermined value at which its capacity is considered to be zero to be almost the same as the total discharged capacity employed in the present invention. Then, the battery replaces the capacity information with the discharged capacity so as to learn the capacity information and compensates the total capacity denoted in the compensation information when the battery capacity becomes zero or a capacity around zero according to the discharged capacity of the battery so as to obtain more accurate capacity information and compensate the error of the compensation information itself.

While the CPU 102 built in each of the main battery 64A and the second battery 64B compensates the capacity information and the compensation information in the first embodiment, the present invention is not limited only to such the method; a controller provided outside each of the main battery 64A and the second battery 64B, for example, the embedded controller 80 shown in FIG. 3 may compensate both capacity information and compensation information thereof.

In such a case, the battery is not always required to store the compensation information in itself. The compensation information may be stored in a memory provided beforehand in the internal circuit 120 so as to be read by the embedded controller 80.

Also, in this case, the embedded controller 80 executes the same processes as those in the flowcharts shown in FIGS. 5 and 6. It is premised here that the embedded controller 80 is a combination of the counting means and the compensating means according to any of claims 6 to 9. And, this second embodiment can also have the same effect as that of the first embodiment.

Furthermore, while the memory for storing such the battery information (the information in the battery information area A1 shown in FIG. 4) as the maker name, the delivery date, etc. and the memory for storing compensation information are identical to the memory 104 respectively, the present invention is not limited only to the case; those memories may be replaced with another memory than the memory 104, so that the compensation information is stored in the memory, of course.

While the first embodiment has been described assuming that the present invention applies to the main battery 64A and the second battery 64B that are configured as an intelligent battery provided with a built-in CPU respectively, the second embodiment of the present invention relates to a battery that is not provided with a CPU. The configuration of each battery except for the connections to other components is identical to that in the first embodiment. The description for that part of the configuration will thus be omitted here, avoiding redundant description.

FIG. 7 shows a block diagram of a main battery 64A' in this second embodiment and the connection between the main battery 64A' and each of other components. In FIG. 7, the same symbols will be given to the same components as those shown in FIG. 3, avoiding redundant description.

As shown in FIG. 7, the main battery 64A' in the second embodiment are the same as the main battery 64A in the first embodiment except that the battery 64A' is not provided with any of the CPU 102 and the resistor 108, and the memory 104' is directly connected to the external terminals T2 and T4.

The external terminal T1 of the main battery 64A' configured as described above is connected to an input terminal of a DC/DC converter 66 via a resistor 110 used to detect the charged/discharged capacity of the battery 106 in the internal circuit 120' of the PC 12. The DC/DC converter 66 receives an electric power from the battery 106 via the main battery 64A'. Both terminals of the resistor 110 are connected to the embedded controller 80, so that the embedded controller 80 can detect the charged/discharged capacity of the battery 106 according to the current of the electric power supply from the battery 106 to the DC/DC converter 66 and detect the voltage of the battery 106 according to the potential at the external terminal T1 side of the resistor 110.

On the other hand, the external terminals T2 and T4 are connected to the embedded controller 80 of the internal circuit 120', so that the embedded controller 80 can write/read various data items to/from the memory 104. The external terminal T3 is also connected to the ground terminal of the internal circuit 120' so as to be grounded.

The second battery is configured just like the main battery 64A' shown in FIG. 7. And, just like in FIG. 7, the external terminals T1 to T4 of the second battery are connected to the DC/DC converter 66, the embedded controller 80, and the ground terminal (none of them is illustrated) respectively.

FIG. 8 shows the data stored in the memory 104' in the second embodiment. As shown in FIG. 8, the memory 104' is different from the memory 104 in that the memory 104' is provided with a battery information area A1 just like the memory 104, but not provided with the compensation information area A2. And, the same compensation information as that in the first embodiment (see Table 1) is stored in the memory (not illustrated) provided in the embedded controller 80 in the second embodiment.

Furthermore, the battery information area A1 is provided with an area for storing the "battery voltage" and the "discharged capacity" (both not illustrated) as data related to the present invention. The embedded controller 80 detects the voltage of the battery 106 so as to keep updating the value of the "battery voltage" and detects the discharged capacity from the battery 106 according to the value of the current flowing in the resistor 110 so as to keep updating the value of the "discharged capacity."

Just like in the first embodiment, the embedded controller 80 in this second embodiment executes the battery capacity information compensating program and the cycle counting program shown in FIGS. 5 and 6 by assuming the memory 104' as the memory 104. In this second embodiment, however, because the compensation information is stored in the memory (not illustrated) built in the embedded controller 80, the memory is accessed to access the compensation information.

Because the PC 12 according to the second embodiment of the present invention stores the compensation information used to compensate the capacity information that denotes the total capacity of the battery with respect to a cycle count of the battery due to the function of this embedded controller 80, the above compensation information can be used to compensate the above capacity information accurately according to the cycle count of the battery even when the battery capacity never comes zero nor a predetermined capacity around zero.

Furthermore, because the PC 12 in this second embodiment detects the charged capacity of the battery and counts the number of cycles of the battery in a unit cycle with respect to the charged capacity. The unit cycle in this case means a capacity obtained by multiplying the total capacity of the battery by a predetermined coefficient. The PC 12 can thus count the number of cycles easily and accurately even when the battery capacity never reaches zero nor a capacity around zero.

Furthermore, because the PC 12 in this second embodiment regards the discharged capacity of the battery integrated until the battery voltage reaches a predetermined capacity at which the battery capacity can be decided as zero to be almost the same as the total discharged capacity employed in the present invention, thereby replacing the capacity information with the discharged capacity so as to learn the capacity information and compensating the total capacity denoted in the compensation information when the battery capacity reaches zero or a capacity around zero according to the discharged capacity of the battery, it is possible to obtain more accurate capacity information and compensate the error of the compensation information itself.

While the number of cycles is counted for a corresponding battery according to the integrated charged capacity in each of the above embodiments, the present invention is not limited only to the method; the number of cycles of the corresponding battery may be counted according to the integrated discharged capacity. And, this case can have the same effect of each of the above embodiments.

Furthermore, while the capacity information is compensated according to the compensation information stored beforehand under a predetermined temperature (40° C.) in the above embodiments, the present invention is not limited only to the method; it may be possible that such a temperature sensor as a thermistor or the like is provided and the compensation information is stored beforehand under each of a plurality of temperatures, so that the capacity information is compensated according to the temperature compensation information that is the closest to the actual ambient temperature of the battery. In this case, the capacity information can be compensated more accurately than in the above embodiments.

The electric power capacity information compensating method in each of the above embodiments may be programmed with use of various programming languages.

This program can be recorded on a recording medium readable from a computer. The recording medium may be any of such portable recording media as a storage device, a floppy disk (FD), a CD-ROM (Read Only Memory that uses a compact disk), and an MO (Magnetic Optical) disk, etc. used for the ROM (Read Only Memory), the EEPROM (Electrically Erasable Programmable Read Only Memory), the flash EEPROM (Flash EEPROM), etc., or any of external storage devices provided for a server computer, etc. connected to a network.

The program recorded on such a recording medium is read into a computer as follows. In case the recording medium on which the program is recorded is a portable one, the medium is loaded in the drive and the program is read from the portable recording medium. The read program is then stored in the main memory.

In case the recording medium is an external storage device connected to a network, the program is down-loaded from the storage device via the network connection device. The down-loaded program is then stored in the main memory.

According to the electric power unit of the present invention as described above, therefore, because the unit stores the compensation information used to compensate the capacity information that denotes the total capacity of the battery with respect to a cycle count and the total capacity of the battery, the compensation information can be used to compensate the above capacity information according to a cycle count of the battery even when the battery capacity never reaches zero nor a predetermined capacity around zero. This is an excellent effect of the present invention.

Furthermore, according to the electric power capacity information compensator and the electric power capacity information compensating method of the present invention, because they have the same function as that of the electric power unit of the present invention, they also have the excellent effect that the capacity information of the battery can be compensated accurately according to a battery cycle count even when the battery capacity never reaches zero nor a capacity around zero.

Furthermore, according to the computer of the present invention, because the computer employs the electric power capacity information compensating method of the present invention, it has an excellent effect that the capacity information of the electric power unit can be compensated accurately.

What is claimed is:

1. An electric power unit comprising:
   a battery;
   an integrator that records a total charge received by said battery during different charging events, wherein an accumulation of said total charge that is equal to a total available capacity of the battery defines one charging cycle;
   an information storage unit for storing compensation information representing the total available capacity of said battery as a function of the number of charging cycles undertaken by said battery;
   a counter for counting said number of battery charging cycles; and
   a compensator for obtaining a value for the total available capacity of said battery from said compensation information based on the number of charging cycles counted by said counter.

2. The electric power unit according to claim 1, wherein said different charging events are partial charges of said battery that are performed when said battery is not fully discharged.

3. The electric power unit according to claim 1, further comprising a temperature sensor for sensing a temperature,
   wherein said information storage unit stores compensation information corresponding to said temperature; and
   said compensator compensates said capacity information according to said compensation information corresponding to said temperature sensed by said temperature sensor.

4. An electric power capacity information compensator employed for an electric power unit provided with a capacity information storage unit in which the total capacity of a built-in battery is stored, the electric power capacity information compensator comprising:

a compensation information storage unit for storing compensation information representing the total capacity of said battery as dependent on the number of charging cycles undertaken by said battery and being enabled to adjust said capacity information;

an integrator that records a total charge receive by said battery during different charging events, wherein an accumulation of said total charge that is equal to a total available capacity of the battery is deemed one charging cycle;

a counter for counting the number of cycles of said battery; and a compensator for obtaining said total capacity corresponding to the number of cycles counted by said counter from said compensation information, thereby compensating said capacity information according to said obtained total capacity.

5. The electric power capacity information compensator according to claim 4;

wherein said different charging events are partial charges of said battery that are performed when said battery is not fully discharged.

6. The electric power capacity information compensator according to claim 4;

said compensator being operable to compensate said capacity information according to the total discharged capacity of said battery integrated until said battery capacity reaches a predetermined capacity and to compensate said total capacity denoted in said compensation information when said battery capacity reaches said predetermined capacity, according to said total discharged capacity of said battery.

7. The electric power capacity information compensator according to claim 4;

said compensator further including a temperature sensor for sensing a temperature;

said compensation information storage unit for storing compensation information corresponding to said temperature; and said compensator being operable to compensate said capacity information according to compensation information corresponding to said temperature sensed by said temperature sensor.

8. A method for compensating battery capacity information in an electric power unit provided with a capacity information storage unit that stores capacity information denoting the total capacity of a built-in battery, comprising the steps of:

storing compensation information representing the total capacity of said battery with respect to the number of charging cycles undertaken by said battery;

recording a total charge received by said battery during different charging events, wherein an accumulation of said total charge that is equal to a total available capacity of the battery is deemed one charging cycle;

counting the number of charging cycles of said battery;

obtaining the total capacity of said battery corresponding to the number of counted cycles; and compensating said capacity information according to said obtained total capacity.

9. The method according to claim 8, wherein said different charging events are partial charges of said battery that are performed when said battery is not fully discharged.

10. The method according to claim 9, wherein said step of compensating said capacity information compensates said capacity information according to the total discharged capacity of said battery integrated until said battery capacity reaches a predetermined capacity and compensates the total capacity denoted in said compensation information when said battery capacity reaches said predetermined capacity, according to the total discharged capacity of said battery.

11. The method according to claim 8, comprising the further step of sensing a temperature, wherein said step of storing compensation information stores compensation information corresponding to said temperature; and said step of compensating said capacity information compensates said capacity information according to compensation information corresponding to said temperature sensed in said step.

12. A recording medium readable by a computer, said recording medium storing a program for compensating the capacity information in an electric power unit provided with a capacity information storage unit that stores capacity information representing the total capacity of a built-in battery, said program comprising program code executable by said computer to carry out the steps of:

storing compensation information representing the total capacity of said battery with respect to the number of charging cycles undertaken by said battery;

recording a total charge received by said battery during different charging events, wherein an accumulation of said total charge that is equal to a total available capacity of the battery is deemed one charging cycle;

counting the number of charging cycles of said battery;

obtaining the total capacity of said battery corresponding to the number of counted cycles; and compensating said capacity information according to said obtained total capacity.

13. The recording medium according to claim 12, wherein said different charging events are partial charges of said battery that are performed when said battery is not fully discharged.

14. The recording medium according to claim 13;

wherein said step of compensating said capacity information compensates said capacity information according to the total discharged capacity of said battery integrated until said battery capacity reaches a predetermined capacity and compensates said total capacity denoted in said compensation information obtained in case said battery capacity reaches said predetermined capacity, according to said total discharged capacity of said battery.

15. The recording medium according to claim 12, comprising a further step of sensing a temperature, wherein said step of storing compensation information stores compensation information corresponding to said temperature; and said step of compensating said capacity information compensates said capacity information according to compensation information corresponding to a temperature sensed in said step.

16. A computer, comprising:
a CPU;
a display device;
an input device;
a battery for supplying power in said computer;
an integrator that records a total charge received by said battery during different charging events, wherein an accumulation of said total charge that is equal to a total available capacity of the battery is deemed one charging cycle; and
an information storage unit for storing compensation information representing the variation in total available capacity of said battery as a function of the number of charging cycles undertaken by said battery.

17. The computer according to claim 16 further comprising:
a counter for counting said number of battery charging cycles; and
a compensator for obtaining a value for the total available capacity of said battery from said compensation information based on the number of charging cycles counted by said counter, and storing the value as capacity information in said information storage unit.

* * * * *